(12) United States Patent
Ziaylek et al.

(10) Patent No.: US 9,308,873 B2
(45) Date of Patent: Apr. 12, 2016

(54) EMERGENCY APPARATUS MOUNTING BRACKET

(71) Applicant: Michael P. Ziaylek, Yardley, PA (US)

(72) Inventors: Michael P. Ziaylek, Yardley, PA (US); W. Brian McGinty, Huntingdon Valley, PA (US)

(73) Assignee: Michael P. Ziaylek, Yardley, PA (US)

( * ) Notice: Subject to any disclaimer, the term of this patent is extended or adjusted under 35 U.S.C. 154(b) by 16 days.

(21) Appl. No.: 14/121,601

(22) Filed: Sep. 23, 2014

(65) Prior Publication Data

US 2015/0329061 A1 Nov. 19, 2015

Related U.S. Application Data

(60) Provisional application No. 61/996,644, filed on May 13, 2014.

(51) Int. Cl.
| | |
|---|---|
| *A47B 96/06* | (2006.01) |
| *A47F 5/00* | (2006.01) |
| *A47F 5/08* | (2006.01) |
| *E04G 3/00* | (2006.01) |
| *B60R 11/00* | (2006.01) |
| *A62B 3/00* | (2006.01) |

(52) U.S. Cl.
CPC ............. *B60R 11/00* (2013.01); *A62B 3/005* (2013.01); *B60R 2011/005* (2013.01); *B60R 2011/0064* (2013.01); *B60R 2011/0084* (2013.01)

(58) Field of Classification Search
CPC ............ B60R 11/00; B60R 2011/0084; B60R 2011/0064; B60R 2011/005; A62B 3/005
USPC .......... 248/205.1, 205.2, 207, 220.21, 220.22
See application file for complete search history.

(56) References Cited

U.S. PATENT DOCUMENTS

| | | | |
|---|---|---|---|
| 1,347,611 A | 7/1920 | Blenko | |
| 1,593,722 A | 7/1926 | Joyce | |
| 1,754,714 A | 4/1930 | Gundrup | |
| 3,236,483 A | 2/1966 | House | |
| 3,714,619 A | 1/1973 | Morgan et al. | |
| 3,942,669 A | 3/1976 | Savage, Jr. | |
| 3,970,274 A | 7/1976 | Resk | |
| 3,971,591 A * | 7/1976 | Ziaylek ............ A47C 7/40 297/188.04 |
| 4,019,708 A | 4/1977 | Croup | |
| 4,206,896 A | 6/1980 | Cadillac | |
| 4,511,109 A | 4/1985 | Cadillac | |
| 4,815,683 A | 3/1989 | Ferrante | |
| 4,846,385 A | 7/1989 | Fratus | |
| 4,962,918 A | 10/1990 | Yang | |

(Continued)

*Primary Examiner* — Mark Wendell
(74) *Attorney, Agent, or Firm* — Fox Rothschild LLP

(57) ABSTRACT

A bracket to facilitate mounting of emergency apparatus such as an extrication tool utilized by emergency personnel which bracket is positionable with respect to environmental structure such as an emergency vehicle, that is, fire trucks or ambulances and the like, which includes a first mounting plate and a second mounting plate which together define therebetween a box housing with a main mounting location positioned in the interior chamber within the two mounting plates which is specifically defined between mounting recesses defined in each respective mounting plate. The bracket can include recess arms adjacent each recess to facilitate usage of this bracket with emergency apparatus of various different external constructions. The recess arms are movably attached with respect to the plates and the bracket includes an adjustably positionable environmental mounting construction.

22 Claims, 8 Drawing Sheets

(56) References Cited

U.S. PATENT DOCUMENTS

| | | |
|---|---|---|
| 5,165,629 A | 11/1992 | Breveglieri |
| 5,515,593 A | 5/1996 | Eagler |
| 5,845,351 A * | 12/1998 | Berta ............... A61G 1/04 |
| | | 5/503.1 |
| 6,053,340 A | 4/2000 | Cameron |
| 6,139,081 A | 10/2000 | Lemieux |
| 6,394,534 B1 | 5/2002 | Dean |
| 6,571,882 B2 | 6/2003 | Yen |
| 6,592,091 B1 | 7/2003 | Michaels |
| 6,688,664 B2 | 2/2004 | Sioutis |
| 6,755,258 B1 | 6/2004 | Hunke et al. |
| 7,234,534 B2 | 6/2007 | Froland et al. |
| 7,451,960 B2 | 11/2008 | Kirchner et al. |
| 7,490,813 B1 | 2/2009 | Weddle |
| 2009/0127416 A1* | 5/2009 | Ziavlek ............... B60R 7/043 |
| | | 248/231.85 |
| 2009/0242716 A1 | 10/2009 | Thon |
| 2009/0250582 A1* | 10/2009 | Ziaylek ............... A62B 25/00 |
| | | 248/312 |

* cited by examiner

EMERGENCY APPARATUS MOUNTING BRACKET

The present utility application hereby formally claims priority of currently pending U.S. Provisional Patent application No. 61/996,644 filed May 13, 2014 on a "Emergency Apparatus Mounting Bracket" filed naming the same inventors as listed herein, namely, Michael P Ziaylek and W Brian McGinty, and assigned to the same assignee as listing herein, namely, Michael P Ziaylek, and said referenced provisional application is hereby formally incorporated by reference as an integral part of the present application.

DESCRIPTION OF THE PRIOR ART

1. Field of the Invention

The present invention deals with the field of devices utilized to facilitate mounting of various different types of emergency apparatus such as extrication tools with respect to surrounding environmental construction. It is a common need to mount such significantly large emergency apparatus, for example, with respect to emergency vehicles such as fire trucks or emergency rescue vehicles in a secure manner to maintain safety during traveling of such emergency vehicles to rescue sites. The bracket can be attached with respect to any portion of the emergency vehicle but is particularly adaptable attached to the floor of the vehicle to facilitate speedy access and removal of the emergency equipment from the secure mounting location as defined above.

2. Description of the Prior Art

A number of patents have been granted on bracket for mounting various types of tools and other apparatus including emergency apparatus such as shown in U.S. Pat. No. 1,347,611 issued Jul. 27, 1920 to W. J. Blenko on a "Support For Fire Extinguishers"; and U.S. Pat. No. 1,593,722 issued Jul. 27, 1926 to B. P. Joyce and assigned to Thomas A. Conlon on a "Fastening Device For Gun Tools"; and U.S. Pat. No. 1,754,714 issued Apr. 15, 1930 to L. Gundrup on a "Bracket"; and U.S. Pat. No. 3,236,483 issued Feb. 22, 1966 to C. E. House on a "Tilting Support"; and U.S. Pat. No. 3,714,619 issued Jan. 30, 1973 to R. A. Morgan et al and assigned to Maschinenfabrik Gehring K G on a "Universal Transducer Mounting Bracket And Assembly"; and U.S. Pat. No. 3,942,669 issued Mar. 9, 1976 to P. M. Savage, Jr. on a "Fire Extinguisher Support And Enclosure Structure"; and U.S. Pat. No. 3,970,274 issued Jul. 20, 1976 to E. E. Resk on a "Tilt Mounting"; and U.S. Pat. No. 4,019,708 issued Apr. 26, 1977 to R. E. Croup and assigned to Acoustic Fiber Sound Systems, Inc. on a "Latchable Swivel Mount For Loudspeaker"; and U.S. Pat. No. 4,206,896 issued Jun. 10, 1980 to J. A. Cadillac et al on a "Mount For A Power Rescue Tool"; and U.S. Pat. No. 4,511,109 issued Apr. 16, 1985 to J. A. Cadillac on a "Mount For A Power Rescue Tool"; and U.S. Pat. No. 4,815,683 issued Mar. 28, 1989 to L. Ferrante on a "Holder For Remote Control Units For TV, VCR And The Like"; and U.S. Pat. No. 4,846,385 issued Jul. 11, 1989 to W. W. Fratus on a "Lockable Mounting Bracket For Chain Saws"; and U.S. Pat. No. 4,962,918 issued Oct. 16, 1990 to T. H. Yang on a "Clamping Set Having Double-Coordinate Clamping Function And Being Extensible For Adjusting Clamp Depth"; and U.S. Pat. No. 5,165,629 issued Nov. 24, 1992 to F. L. Breveglieri and assigned to Geerpres, Inc. on an "Adjustable Tool Holder Assembly"; and U.S. Pat. No. 5,515,593 issued May 14, 1996 to J. O. Eagler and assigned to Oil Equipment Supply Corp. on a "Nozzle Caddy"; and U.S. Pat. No. 6,053,340 issued J. L. Cameron and assigned to John L. Cameron on a "Sports Equipment Storage Rack"; and U.S. Pat. No. 6,139,081 issued Oct. 31, 2000 to M. J. Lemieux and assigned to General Safety Equipment on a "Vehicle Structural Member"; and U.S. Pat. No. 6,394,534 issued May 28, 2002 to T. S. Dean and assigned to Pro Poly of America, Inc. on a "Poly-Bilt Truck"; and U.S. Pat. No. 6,571,882 issued Jun. 3, 2003 to P. L. Yen on a Fire Fighting Vehicle And Equipment"; and U.S. Pat. No. 6,592,091 issued Jul. 15, 2003 to P. Michaels on a "Hair-Dryer Holder"; and U.S. Pat. No. 6,688,664 issued Feb. 10, 2004 to G. Sioutis on a "Multi-Functional Vehicle Equipped With Fire Fighting Equipment And Equipment For Freeing, Rescuing And Transporting Injured Entrapped Persons"; and U.S. Pat. No. 6,755,258 issued Jun. 29, 2004 to J. A. Hunke et al and assigned to Smeal Fire Apparatus Co. on an "Aerial. Ladder Fire Fighting Apparatus With Positionable Waterway"; and U.S. Pat. No. 7,234,534 issued Jun. 26, 2007 to B. I. Froland et al and assigned to Pierce Manufacturing Company on a "Firefighting Vehicle"; and U.S. Pat. No. 7,451,960 issued Nov. 18, 2008 to U. Kirchner et al and assigned to Lukas Hydraulik GmbH on a "Support Apparatus"; and U.S. Pat. No. 7,490,813 issued Feb. 17, 2009 to D. R. Weddle on a "Rescue Tool"; and U.S. Patent Publication No. 2009/0242716 published Oct. 1, 2009 to R. C. Thon on "Tool Holding Brackets".

SUMMARY OF THE INVENTION

The present invention provides an emergency apparatus mounting bracket which is preferably attached with respect to an emergency vehicle such as a fire truck or emergency rescue vehicles to facilitate mounting of an extrication tool or other similar emergency apparatus in a secure manner during transport while allowing rapid deployment thereof. Such a mounting bracket will include a box housing including a first mounting plate which is generally planar and defines a first mounting recess therein. The first mounting plate includes a first interior mounting surface and a first exterior mounting surface which is spatially disposed from the first interior mounting surface. A first peripheral edge is positioned extending between the first exterior mounting surface and the first interior mounting surface and extends therearound. The first mounting surface is defined at a position along the peripheral edge thereof.

A similarly configured second mounting plate will be generally planar and will define a second mounting recess therein. This second mounting plate will include a second interior mounting surface and a second exterior mounting surface which is spatially disposed from the second interior mounting surface. A second peripheral edge will also be defined by the second mounting plate which is positioned extending between the second exterior mounting surface and the second interior mounting surface and extending therearound. The second mounting recess will be defined at a position along the second peripheral edge.

A channel member construction will be included attached with respect to the first mounting plate and also attached to the second mounting plate at a location spatially disposed from the first mounting plate in order to retain the first mounting plate and the second mounting plate spatially disposed from one another to facilitate defining therebetween an interior chamber. The first interior mounting surface of the first mounting plate will be oriented facing the second interior mounting surface of the second mounting plate and are spatially disposed with respect to one another to define the interior chamber therebetween. The first mounting recess of the first mounting plate will be positioned spatially disposed from and in registration with respect to the second mounting recess in order to define a main mounting location which is adapted to receive an emergency apparatus detachably securable with respect thereto.

The bracket will further include a first recess arm attachable to the first mounting plate at a position adjacent to the first mounting recess in order to facilitate retaining of the emergency apparatus in the main mounting location positioned adjacent the first mounting recess. This first recess arm is preferably adjustably movable with respect to the first mounting plate such that it is movable relative to the first mounting recess defined therein. The bracket preferably also includes a second recess arm attachable to the second mounting plate at a position adjacent to the second mounting recess in order to facilitate retaining of an emergency apparatus in the main mounting location positioned adjacent the second mounting recess. This second recess arm is also preferably movably adjustable in such a manner that the position thereof can be adjusted with respect to the second mounting plate and relative to the second mounting recess defined thereadjacent.

The apparatus of the present invention can further include an environmental mounting construction including a first and second mounting foot to facilitate mounting of the bracket with respect to environmental structure. Preferably the environmental mounting means provides adjustability in the orientation of positioning of the bracket relative to environmental structure.

The channel member construction of the present invention preferably includes multiple individual channel member including a long channel member secured to the first mounting plate and is secured to the second mounting plate at a position spatially disposed from the location of securement with respect to the first mounting plate to facilitate maintaining of the interior chamber defined therebetween. An intermediate channel member will also preferably be included which is spatially disposed from the long channel member and is secured to the first mounting plate and secured to the second mounting plate at a position spatially disposed from the location of securement with respect to the first mounting plate to facilitate the interior chamber defined therebetween. The interior channel member is secured with respect to the first mounting plate and the second mounting plate at a position spatially disposed from the long channel member. The construction of the channel member will further preferably include a short channel member secured to the first mounting plate and secured to the second mounting plate at a position spatially disposed from the location of securement with respect to the first mounting plate to facilitate maintaining and defining of the interior chamber therebetween. The short channel member will preferably be smaller than the intermediate channel member and will be spatially disposed therefrom. It also will be spatially disposed from the long channel member. This short channel member along with the interior channel member will be attached directly to the first mounting plate and the second mounting plate at positions preferably adjacent to one another which is spatially disposed from the location of securement of the long channel member in order to maintain a spatially disposed distance between the first mounting plate and the second mounting plate.

A retaining strap will also be preferably included in the construction of the bracket of the present invention which will be attached with respect to the box housing and will be made of a material which is flexibly resilient in a longitudinal direction to facilitate elastic detachable securement of the emergency apparatus with respect to the main mounting location. To further facilitate this securement an attachment hook will be secured with respect to the strap which hook is designed to engage the emergency apparatus at various locations to facilitate resiliently biasing the mounting thereof in position within the main mounting location.

It is an object of the emergency apparatus mounting bracket of the present invention to be attachable with respect to many different configurations of environmental structural to facilitate secure yet detachable mounting of the emergency apparatus as needed.

It is an object of the emergency apparatus mounting bracket of the present invention to be adjustably positionable to facilitate use thereof with various different configurations of emergency apparatuses by providing adjustability to the mounting slots and to the mounting angle orientation.

It is an object of the emergency apparatus mounting bracket of the present invention to be attachable to environmental structure and to include a first and second mounting plate spaced apart to define a main mounting location therebetween which will provide the capability of mounting the emergency apparatus at various different angles to facilitate secure storage while at the same time facilitating rapid deployment thereof.

It is an object of the emergency apparatus mounting bracket of the present invention to be of minimal initial capital costs.

It is an object of the emergency apparatus mounting bracket of the present invention to have minimal maintenance requirements.

It is an object of the emergency apparatus mounting bracket of the present invention to be easy to install by non-experienced personnel.

It is an object of the emergency apparatus mounting bracket of the present invention to be extremely durable when positioned within emergency vehicles which often travel to remote locations of emergencies at high speed and over rough terrain.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which.

DETAILED DESCRIPTION OF THE PREFERRED EMBODIMENT

Figure 1:
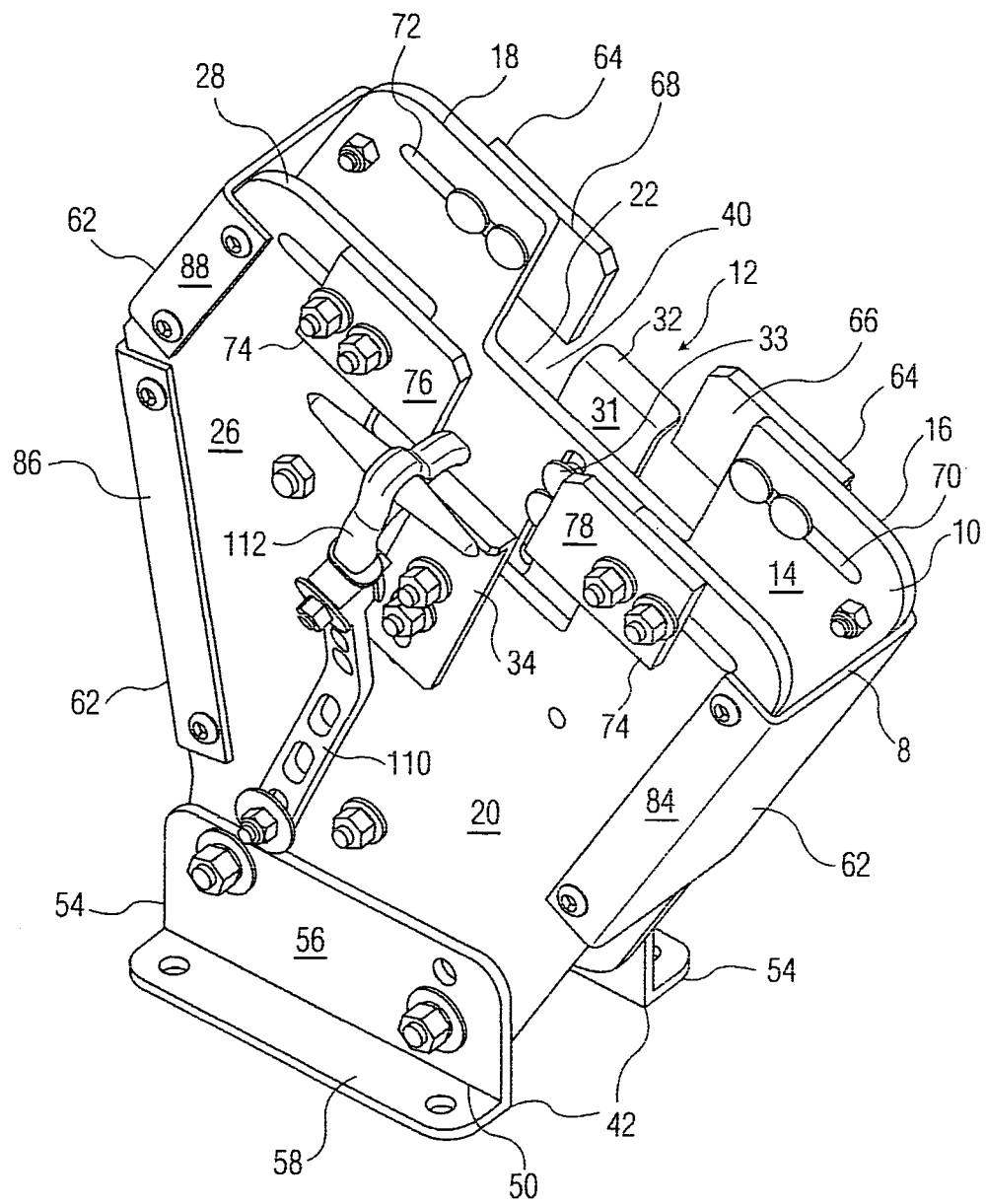
FIG. 1 is a perspective illustration of an embodiment of the mounting bracket of the present invention viewed from the front.
Figure 2:
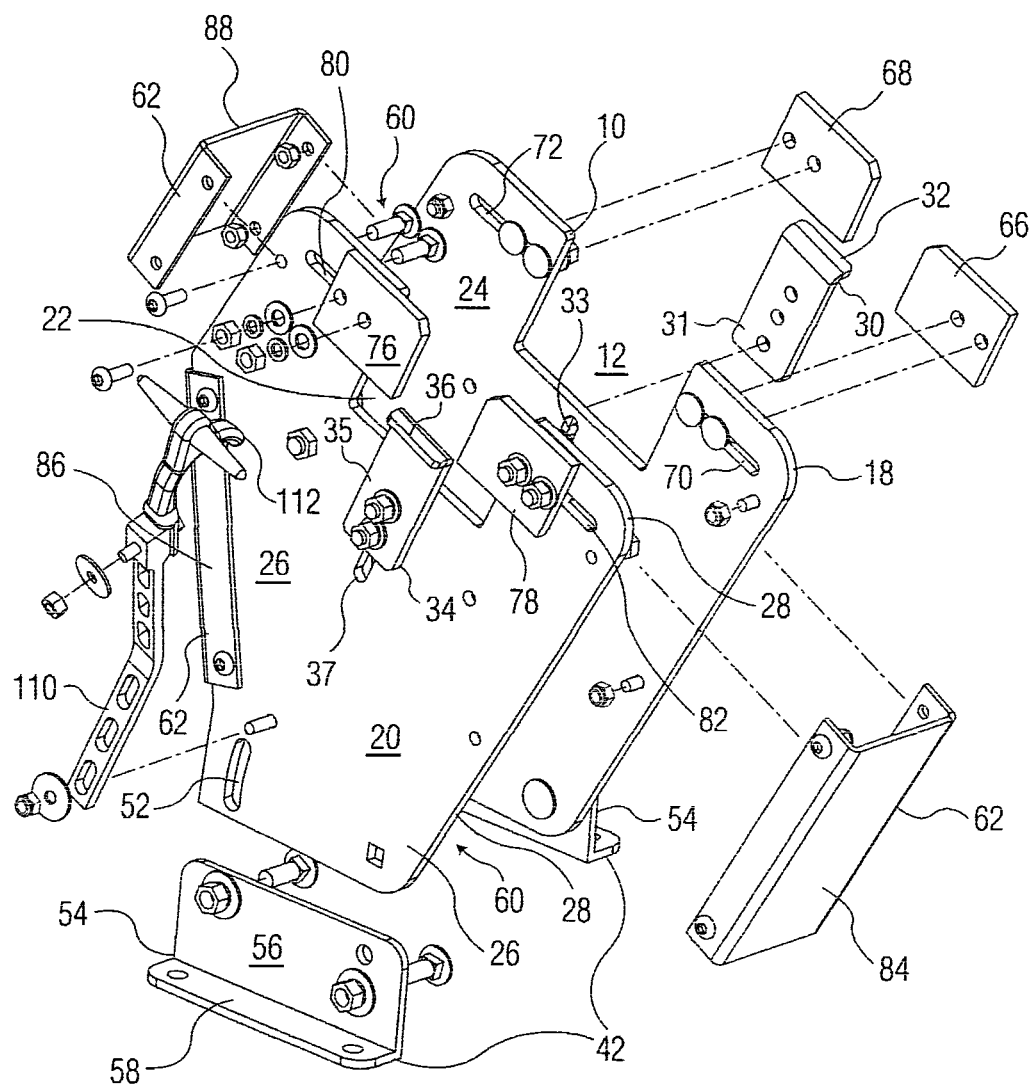
FIG. 2 is an exploded perspective view of the configuration of the mounting bracket illustrated in FIG. 1.
Figure 3:
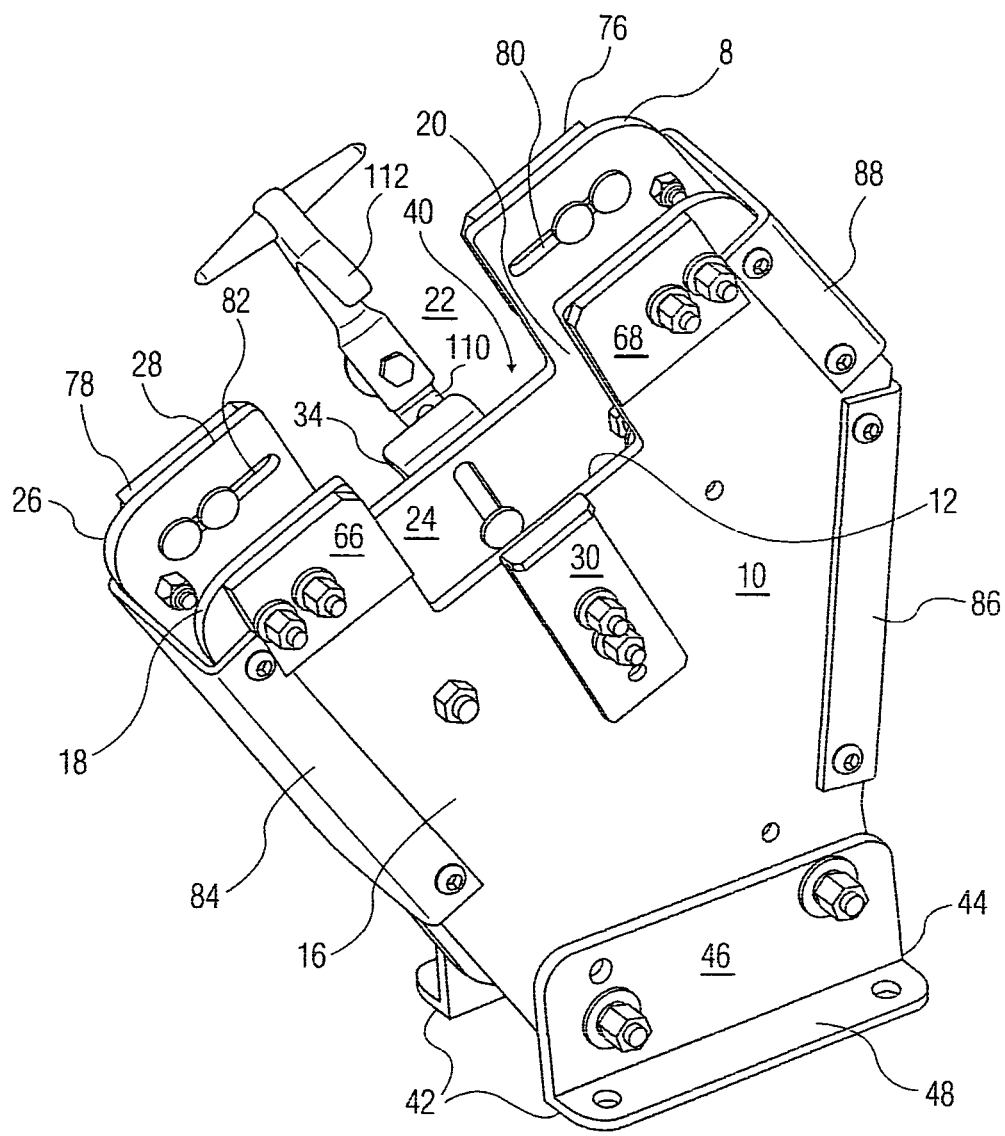
FIG. 3 is a rear perspective view of an embodiment of the mounting bracket shown in FIG. 1.
Figure 4:
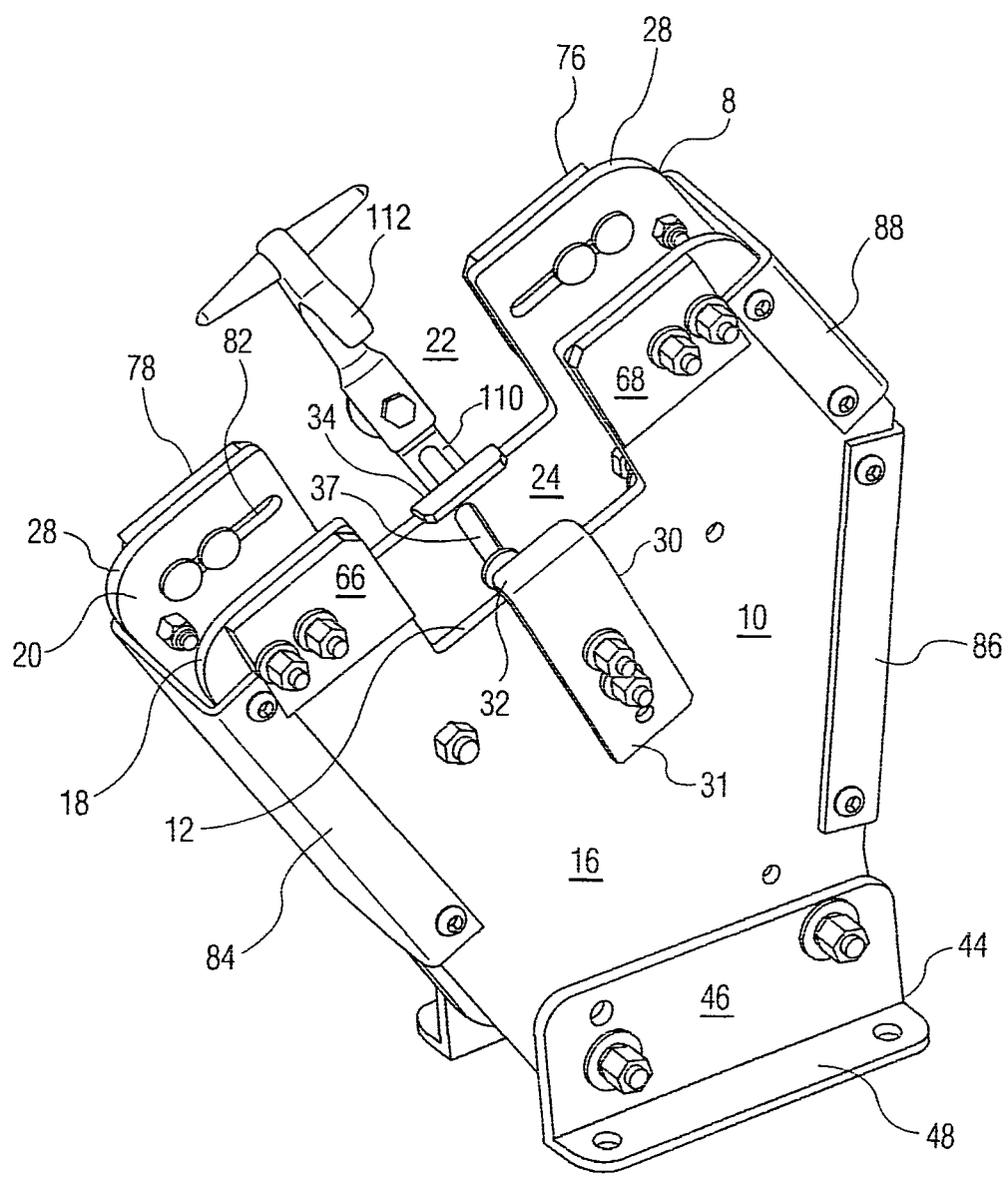
FIG. 4 is an illustration similar to the embodiment shown in FIG. 1 which more clearly depicts the inwardly facing portion of the strap extending upwardly thereabove and which also shows the first and second recess arms mounted with respective first and second recess arm abutment sections extending inwardly toward the interior chamber.
Figure 5:
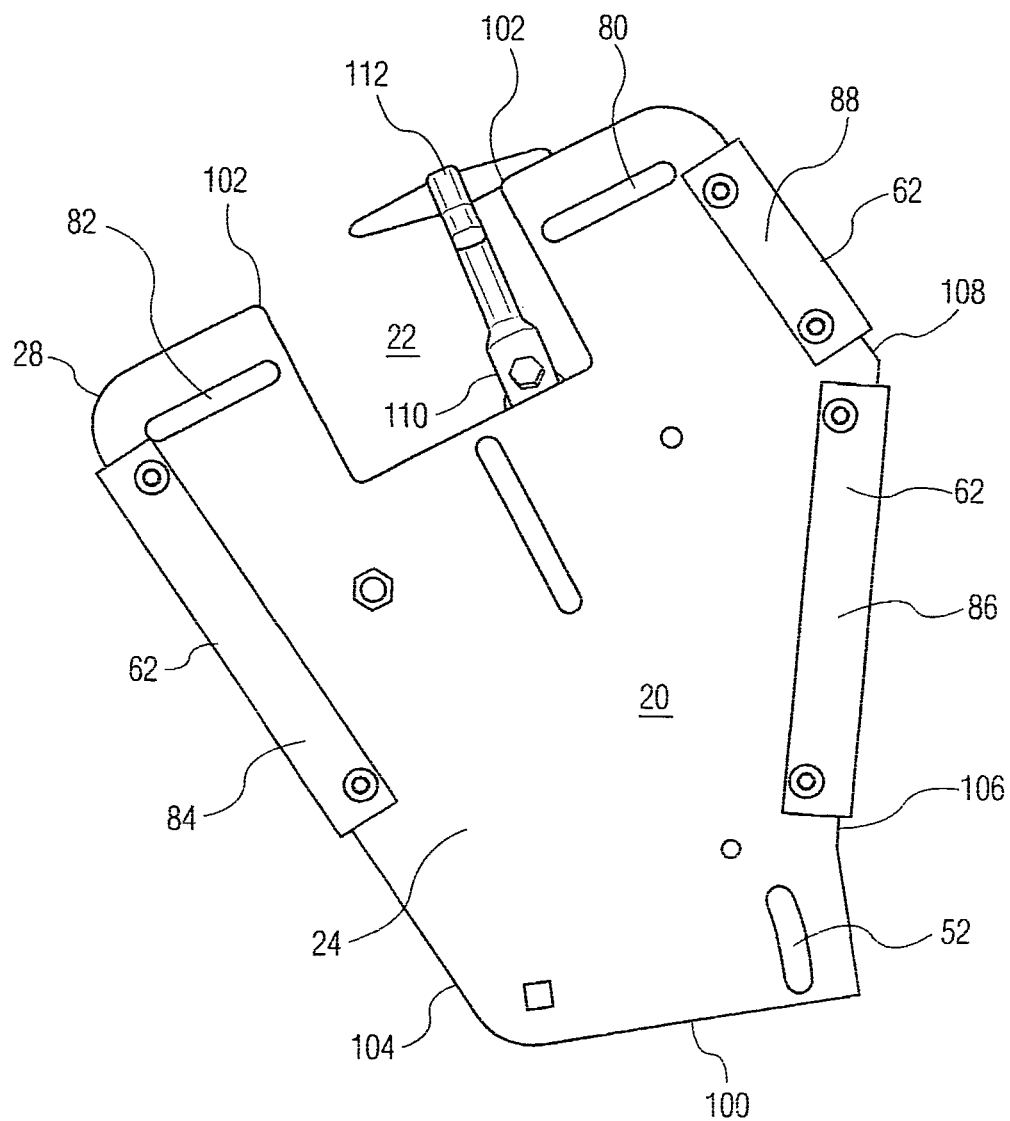
FIG. 5 is a rear plan view of an embodiment of the second mounting plate of the mounting bracket of the present invention.
Figure 6:
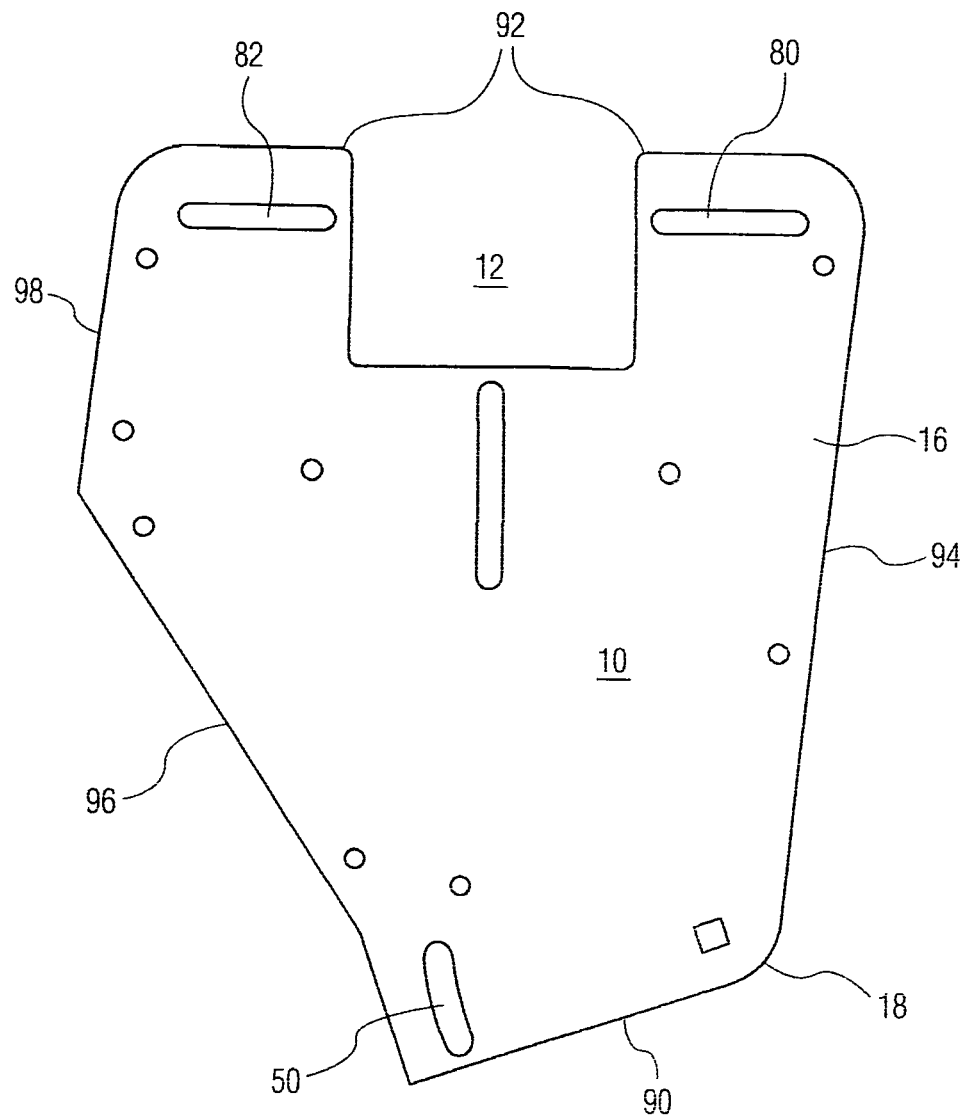
FIG. 6 is a rear plan view of an embodiment of the first mounting plate of the mounting bracket of the present invention.
Figure 7:
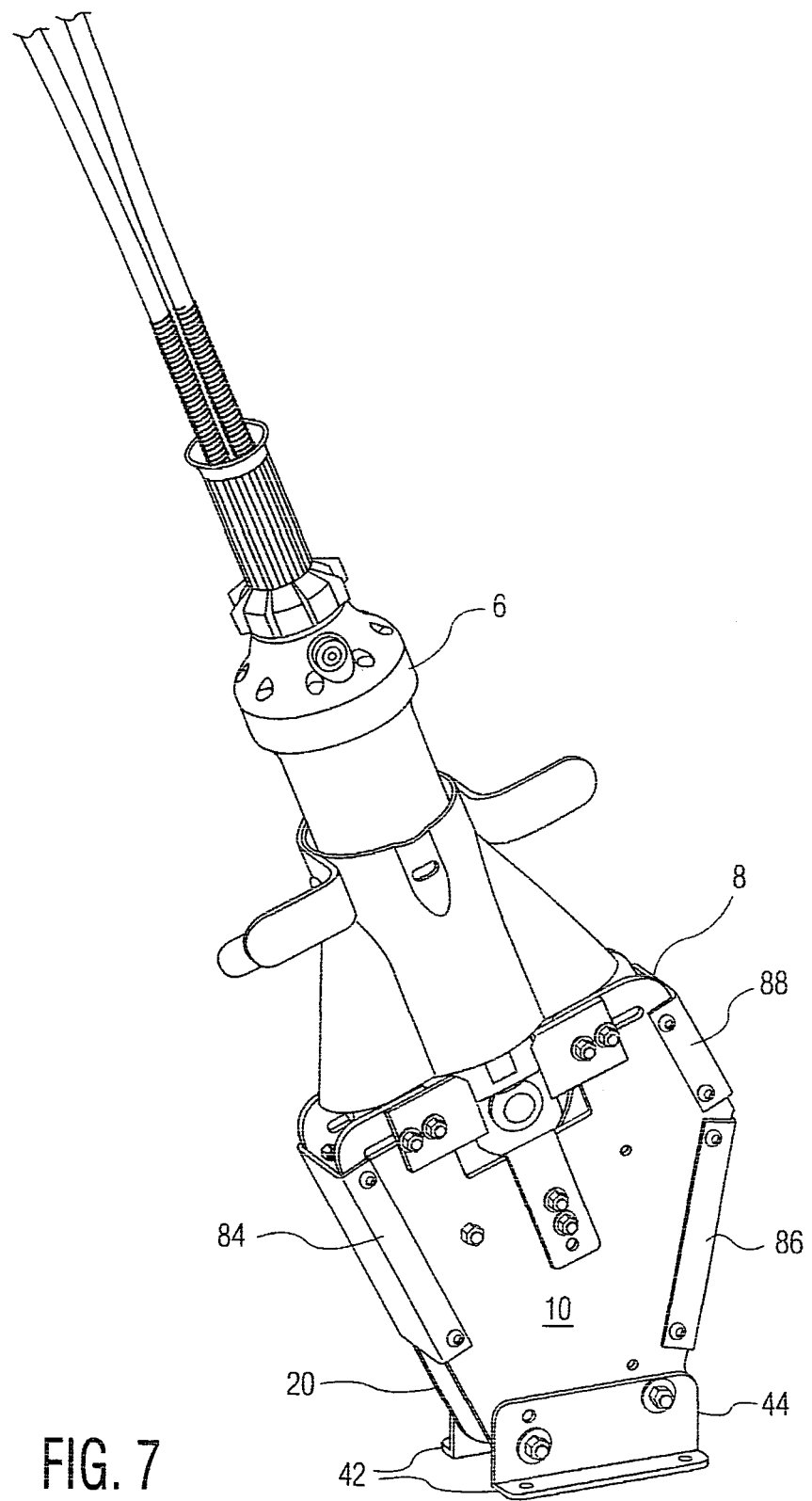
FIG. 7 is a rear perspective view of an embodiment of the present invention shown with an emergency extrication tool mounted in the main mounting location.
Figure 8:
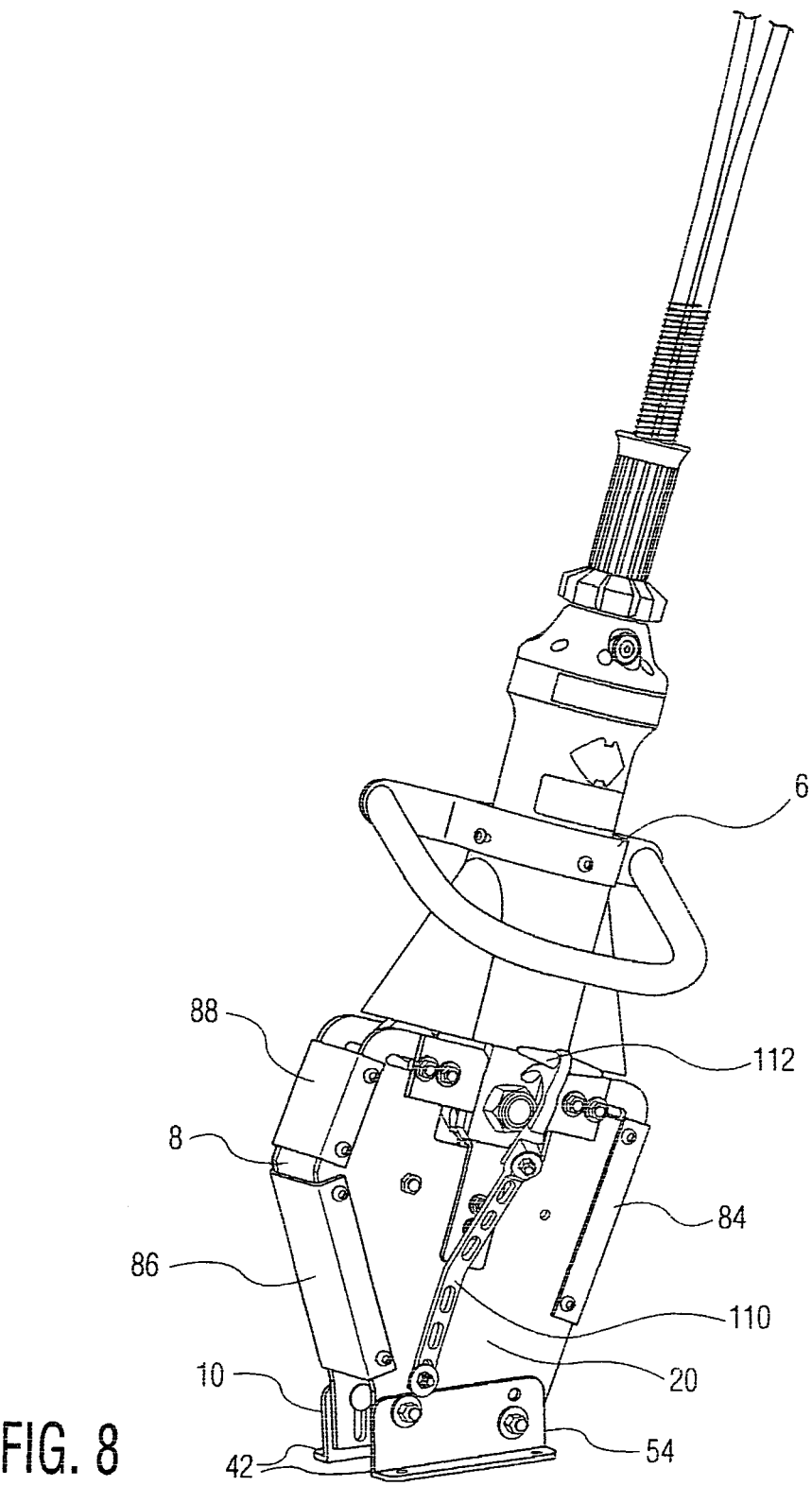
FIG. 8 is a front perspective of an embodiment of the present invention shown with an emergency extrication tool mounted in the main mounting location.

The present invention is usable for the attachment of an emergency apparatus such an extrication tool 6 with respect to environmental structure such as an emergency rescue vehicle or fire truck or other similar emergency vehicles. Such tools or emergency apparatus 6 are normally of significant weight and need to be securely mounted within such emergency vehicles because such vehicles often travel at high speeds over irregular terrain to reach the location of an emergency at which point the emergency apparatus needs to be removed. Also the mounting bracket needs to provide a means for removal of the extrication tool 6 or other emergency apparatus from the mounting bracket in a rapid manner in order to facilitate immediate deployment thereof at the site of an emergency.

The mounting bracket of the present invention achieves the above purposes by defining a mounting box 8 which includes a first mounting plate 10 which is generally planar and defines a first mounting recess 12 therein. The first mounting plate 10 will include a first interior mounting surface 14 and a first exterior mounting surface 16 spatially disposed from the first interior mounting surface 14. The box housing 8 will further define a first peripheral edge 18 positioned extending between the first exterior mounting surface 16 and the first interior mounting surface 14 at a position extending therearound. This first mounting recess 12 will be defined at a position along the first peripheral edge 18.

The emergency apparatus will further define a similar configuration identified as the second mounting plate 20. The second mounting plate 20 will preferably be of a planar configuration and will define a mounting recess 22 therewithin. The second mounting plate 20 will include a second interior mounting surface 24. Plate 20 will further include a second exterior mounting surface 26 which is positioned spatially disposed from the second interior mounting surface 24. Plate 20 will further define a second peripheral edge 28 positioned extending between the second exterior mounting surface 26 and the second interior mounting surface 24 at a position extending therearound. The second mounting recess 22 will be defined at a position along the second peripheral edge 28.

The bracket of the present invention will further include a channel member construction 62 attached with respect to the first mounting plate 10 and also attached to the second mounting plate 20. The attachment location with respect to the second mounting plate 20 will be at a location spatially disposed from the first mounting plate 10 in order to retain the first mounting plate 10 and the second mounting plate 20 spatially disposed from one another to define therebetween an interior chamber means 60.

The first interior mounting surface 14 of the first mounting plate 10 will preferably be oriented facing the second interior mounting surface 24 of the second mounting plate 20 and will be spatially disposed therefrom to define the exterior chamber 60 therebetween. The first mounting recess 12 of the first mounting plate 10 will further be position spatially disposed from and in registration with respect to the second mounting recess 22 in order to define a main mounting location 40 which is adapted to easily receive an emergency apparatus detachably securable thereto.

The apparatus of the present invention will further include a first recess arm 30 attachable to the first mounting plate 10 at a position adjacent to the first mounting recess 12 thereof to facilitate retaining of the emergency apparatus in a main mounting location 40 positioned adjacent to the first mounting recess 12. The first recess arm 30 will be adjustably movable with respect to the first mounting plate 10 and relative to the first mounting recess 12 defined therein. The apparatus will further define a second recess arm 34 attachable with respect to the second mounting plate 20 at a position adjacent to the second mounting recess 22 to facilitate retaining of emergency apparatus in the main mounting location 40 positioned adjacent to the second mounting recess 22. This second recess arm 34 will be adjustably movable with respect to the second mounting plate 20 and relative to the second mounting recess 22 defined therein.

The construction of the present invention will further preferably include an environmental mounting construction 42 which facilitates adjustment of the box housing 8 relative to any chosen environmental structure to which it may be desired to attach to. Such environmental mounting construction 42 will preferably include a first mounting foot 44 attached to the first mounting plate 10 to facilitate securement of the first mounting plate 10 with respect to any chosen environmental structure. Furthermore it will also preferably include a second mounting foot 54 attached to the second mounting plate 20 which facilitates secure mounting of the second mounting plate 20 with respect to any chosen environmental structure. The first mounting foot 44 will preferably include a first mounting angle wall section 46 attached with respect to the first mounting plate 10 and a first mounting angle foot section 48 attached with respect to the first mounting wall angle section 46. Preferably the first mounting angle foot section 48 will extend outwardly therefrom and be attachable with respect to environmental structure thereadjacent.

Furthermore the second mounting foot 54 will preferably include a second mounting angle wall section 56 attached with respect to the second mounting plate 20 but will also include a second mounting angle foot section 58 attached with respect to the second mounting angle wall section 56 at a position extending outwardly therefrom such that it is easy attachable with respect to environmental structure thereadjacent to facilitate adjustability of the first and second mounting feet 44 and 54. The first mounting plate 10 will preferably define a first mounting foot slot 50 therein. The bracket will further include a second mounting foot slot 52 defined in the second mounting plate 20 to facilitate further adjustable positioning of securement of the second mounting foot 54 with respect to the box housing 8.

The main mounting location 40 will preferably be defined between the first mounting recess 12 and the second mounting recess 22 such that it is in fluid flow communication with respect to the interior chamber 60 defined within the box housing 8.

The first recess arm 30 will preferably include a first recess arm mounting section 31 adjustably attachable with respect to the first mounting plate 10. The first recess arm mounting section 31 will preferably be adjustable with respect to the first mounting plate 10 in order to facilitate adjustable positioning of the first recess arm 30 with respect thereto. A first recess arm abutment section 32 will be adapted to abut the emergency apparatus responsive to positioning thereof within the main mounting location 40 to facilitate abutting engagement therewith.

Furthermore the second recess arm 34 will preferably include a second recess arm mounting section 35 adjustably attachable with respect to the second mounting plate 20. The second recess arm mounting section 35 will be adjustable with respect to the second mounting plate 20 in order to facilitate adjustable positioning of the second recess arm 34 with respect thereto. A second recess arm abutment section 36 will be included adapted to abut the emergency apparatus responsive to positioning thereof within the main housing 40 to facilitate abutting engagement therewith.

The mounting bracket of the present invention will further preferably include a configuration of the first mounting plate 10 which defines a first recess arm slot 33 therein to facilitate adjustable attachment of the first recess arm 30 with respect to the first mounting plate 10. With this configuration the second mounting plate 20 will also define a second recess arm slot 37 defined therein to facilitate adjustable attachment of the second recess arm 34 with respect to the second mounting plate 20.

To enhance operation of the present invention the emergency apparatus mounting bracket of the present invention will preferably include a first supplemental plate construction 64 adjustably attachable with respect to the first mounting plate 10 at a position adjacent said first mounting recess 12 defined therein. The first supplemental plate construction 64 will preferably be positionable extending into and over a portion of the first mounting recess 12 for the purpose of facilitating engagement thereof with respect to various configurations of different emergency apparatuses such as those having various sizes and configurations.

The mounting bracket will further preferably include a second supplemental plate construction 74 which is adjustably attachable with respect to the second plate 20 at a position adjacent the second mounting recess 22 defined therein. This second supplemental plate construction 74 will be positionable extending into and over the second mounting recess 22 to allow engagement thereof with respect to various different sizes and configurations of emergency apparatuses.

The first supplemental plate construction 64 of the mounting bracket of the present invention will preferably include a primarily first supplemental plate 66 selectively positionable to a position extending into the first mounting recess 12. First supplemental plate construction 64 will preferably also include a secondary first supplemental plate construction 68 positioned spatially disposed from the primary first supplemental plate member 66 and selectively positionable extending the first mounting recess 12.

To further facilitate secure detachable use of the mounting bracket of the present invention the first mounting plate 10 will preferably define a primary first supplemental plate slot means 70 positioned adjacent to the primary first supplemental plate member 66 in order to facilitate selectively adjustable positioning thereof with respect to the first mounting recess 12. Also the first mounting plate 10 will define a secondary first supplemental plate slot means 72 positioned adjacent to the secondary first supplemental plate member 68 to facilitate selectively adjustable positioning thereof relative to the first mounting recess 10.

The mounting bracket of the present invention will preferably include a second supplemental plate construction 74 which includes a primary second supplemental plate member 76 selectively positionable extending into the second mounting recess 22. It will also include a secondary second supplemental plate member 78 positioned spatially disposed from the primary second supplemental plate member 76 and selectively positionable extending into the second mounting recess 22.

Furthermore the mounting bracket of the present invention and, in particular, the second mounting plate 20 thereof will preferably include a primary second supplemental plate slot means 80 positioned adjacent the primary second supplemental plate member 76 to facilitate selective adjustable positioning thereof relative to the second mounting recess 22. The second mounting plate 20 will also preferably define a secondary second supplemental plate slot means 82 positioned adjacent to the secondary second supplemental plate member 78 to facilitate selectively adjustable positioning thereof with respect to the second mounting recess 22.

The channel member 62 of the mounting bracket of the present invention will preferably include a long channel member 84 secured to the first mounting plate and to the second mounting plate at a position spatially disposed from the location of securement of the first mounting plate 10 to facilitate maintaining the interior chamber means 60 defined therebetween. The channel member construction 62 will preferably also include an intermediate chamber member 86 spatially disposed from the long channel member and secured to the first mounting plate 10 as well as being secured to the second mounting plate 20 at a position spatially disposed from first mounting plate 10. In this manner the intermediate channel member 56 will facilitate maintaining the interior chamber means 60 defined thereadjacent. The intermediate channel member 86 will preferably be secured to the first mounting plate 10 and the second mounting plate 20 at a location spatially disposed from the long channel member 84. The channel member construction will preferably also include a short channel member 88 secured to the first mounting plate 10 and secured to the second mounting plate 20 at position spatially disposed from the location of securement with respect to the first mounting plate 10 to facilitate defining of the interior chamber 60 therebetween. This short channel member 88 will preferably be smaller than the intermediate channel member 86 and will be positioned adjacent thereto. It will also be positioned spatially disposed from the long channel member. The intermediate channel member 86 and the short channel member 88 will both be directly attached to the first mounting plate 10 and the second mounting plate 20 at positions adjacent to one another and spatially disposed from the long channel member 84 in order to maintain a spatially disposed distance between the first mounting plate 10 and the second mounting plate 20.

The mounting bracket of the present invention will further preferably include a construction for the first peripheral edge 18 of the first mounting plate 10 which includes a first foot edge 90 attachable with respect to surrounding environmental structure as well as a first recess edge 92 spatially disposed from the first foot edge 90 and first recess edge 92 to define the first mounting recess 12 therein. It will also include a first long edge 94 extending between a position adjacent the first foot edge 90 and a position adjacent the first recess edge 92. First peripheral edge 18 will also include a first intermediate edge 96 positioned adjacent to the first foot edge 90 and extending outwardly away therefrom in a direction generally toward the first recess edge 92. First peripheral edge 18 will further include a first short edge 98 positioned adjacent to the first recess edge 92 and extend outwardly therefrom to a position adjacent to the first intermediate edge 96.

The second peripheral edge 28 of the second mounting plate 20 will include a similar construction wherein it includes a second foot edge 100 attachable with respect to environmental mounting construction and a second recess edge 102 spatially disposed from the second foot edge 100. The second recess edge 102 will define the second mounting recess 22 therein. Second peripheral edge 28 will further include a second long edge 104 extending between a position adjacent the second foot edge 100 and a position adjacent the second recess edge 102. Also included will be a second intermediate edge 106 positioned adjacent the second foot edge 100 and extending outwardly therefrom in a direction generally toward the second recess edge 102. Furthermore the second peripheral edge 28 will include a second short edge 108 positioned adjacent to the second recess edge 102 and extend outwardly away therefrom to a position adjacent to the second intermediate edge 106.

The mounting bracket of the present invention preferably includes a long channel member 84 secured to the first long edge 94 of the first mounting plate 10. Preferably it is also secured to the second long edge 104 of the second mounting plate 20. In this manner the intermediate channel member 86 is secured to the first intermediate edge 96 of the first mounting plate 10 and also is secured to the second intermediate edge 106 of the second mounting plate 20. As such, furthermore, the short channel member 88 is secured to the first short edge 98 of first mounting plate 10 and is also secured to the second short edge 108 of second mounting plate 20.

A further preferred configuration of the mounting bracket of the present invention includes a construction wherein the first recess arm abutment section 32 is oriented approximately perpendicular with respect to the first recess arm mounting section 31 in order to facilitate selective positioning of the first recess arm abutment section 32 such that it is oriented extending selectively inwardly into the first mounting recess 12 or outwardly away from the first mounting recess 12. With this configuration the second recess arm abutment section 36 is oriented approximately perpendicular with respect to the second recess arm mounting section 35 to facilitate selective positioning of the second recess arm abutment section 36 oriented extending selectively inwardly into the second mounting recess 22 or outwardly away from the second mounting recess 22 selectively as desired.

The mounting bracket of the present invention will preferably further include a retaining strap 110 attached with respect to the box housing 8. This retaining strap will be flexibly resilient longitudinally and will preferably include an attachment hook 112 which is selectively detachably securable with respect to an emergency apparatus when positioned in the main mounting location 40 for selective attachment therebetween. Preferably the retaining strap 110 will be of a rubber or elastic type material in order to provide longitudinally resilient extending thereof.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:
1. An emergency apparatus mounting bracket attachable to an environmental structure and comprising:
  A. a box housing including:
    (1) a first mounting plate being generally planar and defining a first mounting recess means therein, said first mounting plate including:
      (a) a first interior mounting surface;
      (b) a first exterior mounting surface spatially disposed from said first interior mounting surface;
      (c) a first peripheral edge positioned extending between said first exterior mounting surface and said first interior mounting surface and extending therearound, said first mounting recess being defined at a position along said first peripheral edge;
    (2) a second mounting plate being generally planar and defining a second mounting recess means therein, said second mounting plate including:
      (a) a second interior mounting surface;
      (b) a second exterior mounting surface spatially disposed from said second interior mounting surface;
      (c) a second peripheral edge positioned extending between said second exterior mounting surface and said second interior mounting surface and extending therearound, said second mounting recess defined at a position along said second peripheral edge;
    (3) a channel member means attached with respect to said first mounting plate and also being attached to said second mounting plate at a location spatially disposed from said first mounting plate to retain said first mounting plate and said second mounting plate being spatially disposed with respect to one another to define therebetween an interior chamber means, said first interior mounting surface of said first mounting plate facing said second interior mounting surface of said second mounting plate are spatially disposed with respect to one another to define said interior chamber means therebetween, said first mounting recess of said first mounting plate being positioned spatially disposed from and in registration with respect to said second mounting recess to define a main mounting location therewith which is adapted to receive an emergency apparatus detachably securable with respect thereto;
  B. a first recess arm attachable to said first mounting plate at a position adjacent to said first mounting recess means to facilitate retaining of emergency apparatus in said main mounting location positioned adjacent said first mounting recess means, said first recess arm being adjustably movable with respect to said first mounting plate and relative to said first mounting recess means defined therein; and
  C. a second recess arm attachable to said second mounting plate at a position adjacent to said second mounting recess means to facilitate retaining of emergency apparatus in said main mounting location positioned adjacent said second mounting recess means, said second recess arm being adjustably movable with respect to said second mounting plate and relative to said second mounting recess means defined therein.

2. An emergency apparatus mounting bracket as defined in claim 1 further comprising an environmental mounting means to facilitate securement of said box housing with respect to environmental structure thereadjacent.

3. An emergency apparatus mounting bracket as defined in claim 2 wherein said environmental mounting means comprises:
  A. a first mounting foot attached to said first mounting plate to facilitate securement of said first mounting plate with respect to environmental structure; and
  B. a second mounting foot attached to said second mounting plate to facilitate securement of said second mounting plate with respect to environmental structure.

4. An emergency apparatus mounting bracket as defined in claim 3 wherein said first mounting foot includes:
  A. a first mounting angle wall section attached with respect to said first mounting plate; and
  B. a first mounting angle foot section attached with respect to said first mounting wall angle section and extending outwardly therefrom and being attachable with respect to environmental structure thereadjacent.

5. An emergency apparatus mounting bracket as defined in claim 4 wherein said second mounting foot includes:
A. a second mounting angle wall section attached with respect to second first mounting plate; and
B. a second mounting angle foot section attached with respect to said second mounting wall angle section and extending outwardly therefrom and being attachable with respect to environmental structure thereadjacent.

6. An emergency apparatus mounting bracket as defined in claim 4 wherein said first mounting plate defines a first mounting foot slot means to facilitate adjustability of the position of securement of said first mounting foot with respect to said box housing.

7. An emergency apparatus mounting bracket as defined in claim 4 wherein said second mounting plate defines a second mounting foot slot means to facilitate adjustability of the position of securement of said second mounting foot with respect to said box housing.

8. An emergency apparatus mounting bracket as defined in claim 1 wherein said main mounting location is defined positioned between said first mounting recess and said second mounting recess and is in full fluid flow communication with respect to said interior chamber means defined within said box housing.

9. An emergency apparatus mounting bracket as defined in claim 1 wherein said first recess arm includes:
A. a first recess arm mounting section adjustably attachable with respect to said first mounting plate, said first recess arm mounting section being adjustable with respect to said first mounting plate to facilitate adjustable positioning of said first recess arm with respect thereto; and
B. a first recess arm abutment section adapted to abut emergency apparatus responsive to positioning thereof within said main mounting location to facilitate abutting engagement therewith.

10. An emergency apparatus mounting bracket as defined in claim 1 wherein said second recess arm includes:
A. a second recess arm mounting section adjustably attachable with respect to said second mounting plate, said second recess arm mounting section being adjustable with respect to said second mounting plate to facilitate adjustable positioning of said second recess arm with respect thereto; and
B. a second recess arm abutment section adapted to abut emergency apparatus responsive to positioning thereof within said main mounting location to facilitate abutting engagement therewith.

11. An emergency apparatus mounting bracket as defined in claim 9 wherein said first mounting plate defines a first recess arm slot means therein to facilitate adjustable attachment of said first recess arm with respect to said first mounting plate, and wherein said second mounting plate defines a second recess arm slot means therein to facilitate adjustable attachment of said second recess arm with respect to said second mounting plate.

12. An emergency apparatus mounting bracket as defined in claim 1 further comprising:
A. a first supplemental plate construction adjustably attachable with respect to said first mounting plate at a position adjacent said first mounting recess defined therein, said first supplemental plate construction being positionable extending into and over a portion of said first mounting recess to facilitate engagement thereof with respect to different emergency apparatuses of varying sizes and configurations; and
B. a second supplemental plate construction adjustably attachable with respect to said second mounting plate at a position adjacent said second mounting recess defined therein, said second supplemental plate construction being positionable extending into and over said second mounting recess to facilitate engagement thereof with respect to various different emergency apparatuses of varying sizes and configurations.

13. An emergency apparatus mounting bracket as defined in claim 12 wherein said first supplemental plate construction includes:
A. a primary first supplemental plate member selectively positionable extending into said first mounting recess; and
B. a secondary first supplemental plate member positioned spatially disposed from said primary first supplemental plate member and being selectively positionable extending into said first mounting recess.

14. An emergency apparatus mounting bracket as defined in claim 13 wherein said first mounting plate defines primary first supplemental plate slot means positioned adjacent said primary first supplemental plate member to facilitate selectively adjustable positioning thereof with respect to said first mounting recess, and wherein said first mounting plate also defines secondary first supplemental plate slot means positioned adjacent said secondary first supplemental plate member to facilitate selectively adjustable positioning thereof with respect to said first mounting recess.

15. An emergency apparatus mounting bracket as defined in claim 12 wherein said second supplemental plate construction includes:
A. a primary second supplemental plate member selectively positionable extending into said second mounting recess; and
B. a secondary second supplemental plate member positioned spatially disposed from said primary second supplemental plate member and being selectively positionable extending into said second mounting recess.

16. An emergency apparatus mounting bracket as defined in claim 15 wherein said second mounting plate defines primary second supplemental plate slot means positioned adjacent said primary second supplemental plate member to facilitate selectively adjustable positioning thereof with respect to said second mounting recess, and wherein said second mounting plate also defines secondary second supplemental plate slot means positioned adjacent said secondary second supplemental plate member to facilitate selectively adjustable positioning thereof with respect to said second mounting recess.

17. An emergency apparatus mounting bracket as defined in claim 1 wherein said channel member means includes:
A. a long channel member secured to said first mounting plate and secured to said second mounting plate at a position spatially disposed from the location of securement with respect to said first mounting plate to facilitate maintaining said interior chamber means defined therebetween;
B. an intermediate channel member spatially disposed from said long channel member being secured to said first mounting plate and secured to said second mounting plate at a position spatially disposed from the location of securement with respect to said first mounting plate to facilitate maintaining said interior chamber means defined therebetween, said intermediate channel member being secured with respect to said first mounting plate and said second mounting plate at a position spatially disposed from said long channel member; and
C. a short channel member secured to said first mounting plate and secured to said second mounting plate at a position spatially disposed from the location of securement with respect to said first mounting plate to facilitate defining of said interior chamber means therebetween, said short channel member being smaller than said intermediate channel member and adjacent thereto and also being spatially disposed from said long channel member, said intermediate channel member and said short channel member being attached to said first mounting plate and said second mounting plate at positions adjacent to one another and spatially disposed from said long channel member in order to maintain a spatially disposed distance between said first mounting plate and said second mounting plate.

18. An emergency apparatus mounting bracket as defined in claim 17 wherein said first peripheral edge of said first mounting plate includes:
   A. a first foot edge attachable with respect to surrounding environmental structure:
   B. a first recess edge spatially disposed from said first foot edge, said first recess edge defining said first mounting recess therein;
   C. a first long edge extending between a position adjacent said first foot edge and a position adjacent said first recess edge;
   D. a first intermediate edge positioned adjacent said first foot edge and extending outwardly away therefrom in a direction generally toward said first recess edge; and
   E. a first short edge positioned adjacent said first recess edge and extending outwardly away therefrom to a position adjacent said first intermediate edge.

19. An emergency apparatus mounting bracket as defined in claim 18 wherein said second peripheral edge of said second mounting plate includes:
   A. a second foot edge attachable with respect to surrounding environmental structure:
   B. a second recess edge spatially disposed from said second foot edge, said second recess edge defining said second mounting recess therein;
   C. a second long edge extending between a position adjacent said second foot edge and a position adjacent said second recess edge;
   D. a second intermediate edge positioned adjacent said second foot edge and extending outwardly away therefrom in a direction generally toward said second recess edge; and
   E. a second short edge positioned adjacent said second recess edge and extending outwardly away therefrom to a position adjacent said second intermediate edge.

20. An emergency apparatus mounting bracket as defined in claim 19 wherein said long channel member is secured to said first long edge of said first mounting plate and also is secured to said second long edge of said second mounting plate, and wherein said intermediate channel member is secured to said first intermediate edge of said first mounting plate and also is secured to said second intermediate edge of said second mounting plate, and wherein said short channel member is secured to said first short edge of said first mounting plate and also is secured to said second short edge of said second mounting plate.

21. An emergency apparatus mounting bracket as defined in claim 1 wherein said first recess arm abutment section is oriented approximately perpendicularly with respect to said first recess arm mounting section to facilitate selective positioning of said first recess arm abutment section oriented extending selectively inwardly into said first mounting recess or outwardly away from said first mounting recess, and wherein said second recess arm abutment section is oriented approximately perpendicularly with respect to said second recess arm mounting section to facilitate selective positioning of said second recess arm abutment section oriented extending selectively inwardly into said second mounting recess or outwardly away from said second mounting recess.

22. An emergency apparatus mounting bracket as defined in claim 1 further including a retaining strap attached with respect to said box housing, said retaining strap being flexibly resilient longitudinally, said retaining strap including an attachment hook being selectively detachably secureable with respect to emergency apparatus when positioned in said main mounting location for selective detachable attachment therebetween.

* * * * *